(No Model.)

J. W. POLLOCK.
COMBINED HARROW AND CULTIVATOR.

No. 276,071. Patented Apr. 17, 1883.

WITNESSES
H. L. Ourand
N. E. Oliphant

INVENTOR
John W. Pollock,
per Chas. H. Fowler
Attorney

UNITED STATES PATENT OFFICE.

JOHN W. POLLOCK, OF FORTY EIGHT, TENNESSEE.

COMBINED HARROW AND CULTIVATOR.

SPECIFICATION forming part of Letters Patent No. 276,071, dated April 17, 1883.

Application filed November 25, 1882. (No model.)

*To all whom it may concern:*

Be it known that I, JOHN W. POLLOCK, a citizen of the United States, residing at Forty Eight, in the county of Wayne and State of Tennessee, have invented certain new and useful Improvements in Combined Harrow and Cultivator; and I do hereby declare that the following is a full, clear, and exact description of the same, reference being had to the annexed drawings, making a part of this specification, and to the letters and figures of reference marked thereon.

Figure 1:
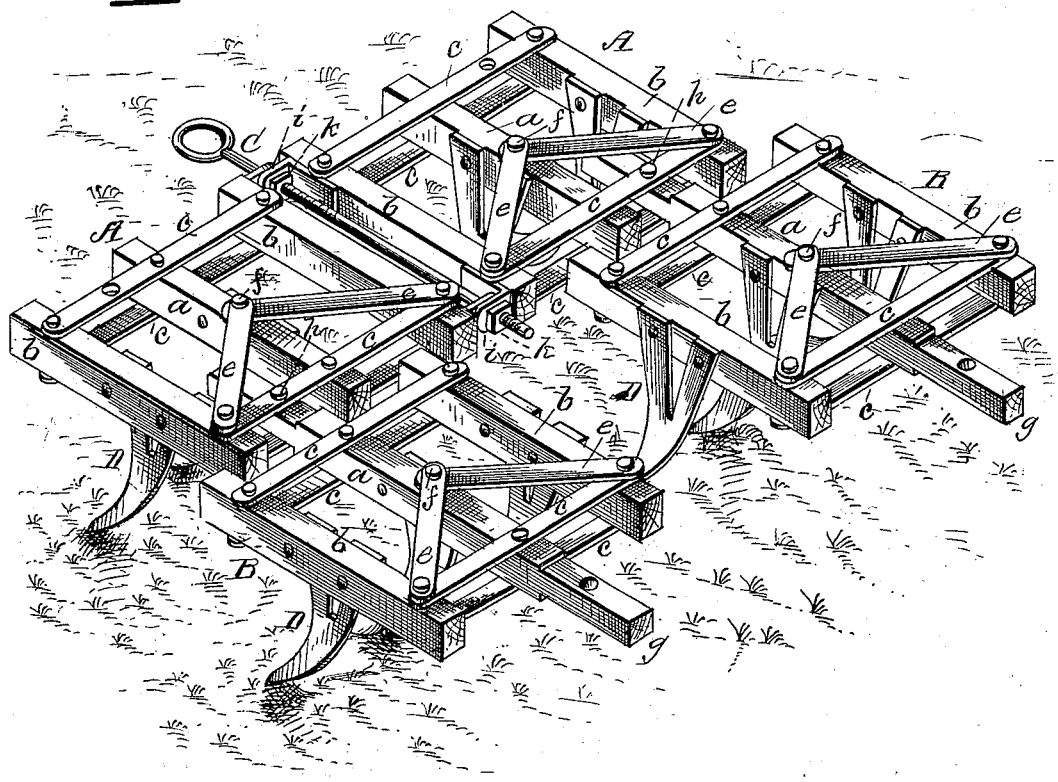
Figure 2:
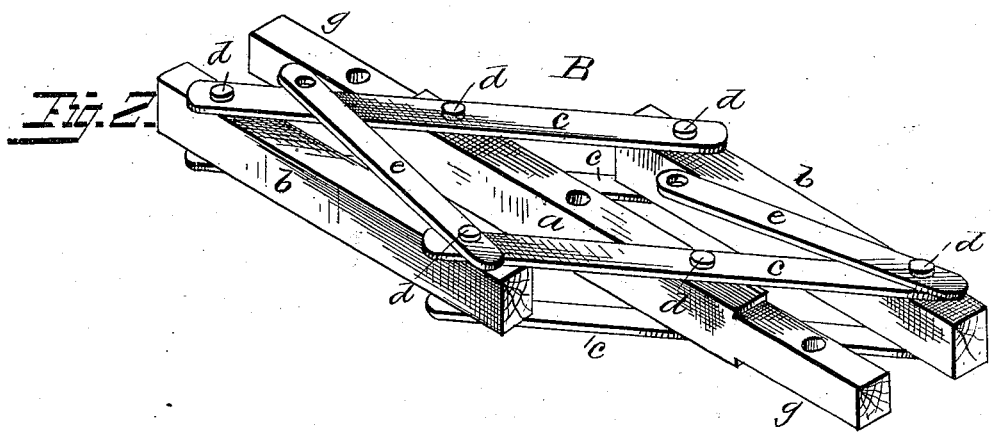

Figure 1 of the drawings is a perspective view of my invention; and Fig. 2, a detail view, in perspective, of one of the harrow-sections with the teeth removed, and showing the section partially folded.

The present invention has relation to that class of combined harrows and cultivators formed of several sections suitably connected together, and the object thereof is to provide a simple and practical machine that will perfectly do its work, and in which each section can be detached and the two rear sections used independently of the others, or folded up in a compact form when not required for use. These objects I attain by the construction substantially as shown in the drawings, and hereinafter described and claimed.

In the accompanying drawings, A B represent the harrow-sections, four in number, each section consisting of the central beam, a, and two side beams, b, connected together at their forward and rear ends by braces c, both at their top and bottom, thus forming a simple, strong, and durable harrow-section. The braces c are pivoted to the beams a b by pins d, and at the upper side only of the beams are pivoted stays e, which hold the beams extended by a removable pin, f, connecting the ends of the stays to the central beam. The central beam of the sections B has an extension, g, at both its ends, by means of which the sections A can be connected at either end thereof by removable pins h, passing through a hole in the braces c and extension g. The sections A are each provided upon one of their side beams with eye-plates i, through which passes the draft-rod C, held by suitable nuts, k, engaging with the screw-threaded portions of said rod. To the sections A B are suitably bolted or otherwise connected a series of curved teeth, D, which are thin splitting teeth, and any number can be used—two teeth on each beam, if desired, one on each side. Other forms of teeth can be substituted, either what is known as "calf-tongues" or shovels, by attaching to the beams the usual helves of wood or iron. A seat also may be connected to the harrow or cultivator, and also handles similar to the ordinary plow-handles. The four sections A B can be separated and used as treble or double shovels as well as a cultivating-harrow, and either section can be used with a shovel in front and a corn-dropper or other seed-dropper placed above and behind it, and a calf-tongue on each side to cover the grain, and a board attached behind them to scrape it off and smooth the ground.

As will be seen, the sections A B can be separated from each other and used as above specified by removing the nuts K and withdrawing the draft-rod C and the pins h, or the two rear sections, B, placed at the other end of the sections A and the draft-rod reversed to hitch the team to. By thus changing the position of the sections A B and reversing the draft, the curved or opposite edge of the teeth D will be presented to the line of draft and the teeth used for splitting clods or tearing or splitting up the ground.

When it is desired to fold the sections A B in a compact form for transportation, or to bring the side beams, b, nearer to the central beam, a, the pin f is withdrawn, thus allowing the beams to be folded against each other or brought to the position as shown in Fig. 2.

Having now fully described my invention, what I claim as new, and desire to secure by Letters Patent, is—

In a harrow or cultivator, the combination, with the sections A, constructed substantially as described, and detachably connected by the removable rod C, of the sections B, having central beam, a, with tongues g, adapted for attachment to either end of the sections A, the several sections being provided with curved teeth, substantially as and for the purpose set forth.

In testimony that I claim the above I have hereunto subscribed my name in the presence of two witnesses.

JOHN W. POLLOCK.

Witnesses:
T. S. CARR,
J. A. STANFIELD.